(12) United States Patent
Willis (10) Patent No.: US 7,092,622 B1
(45) Date of Patent: Aug. 15, 2006

(54) DVD RECORDER PAUSE FEATURE UTILIZING VARIABLE READ RATE

(75) Inventor: Donald Henry Willis, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 441 days.

(21) Appl. No.: 10/129,633

(22) PCT Filed: Nov. 8, 2000

(86) PCT No.: PCT/US00/30698

§ 371 (c)(1),
(2), (4) Date: Sep. 27, 2002

(87) PCT Pub. No.: WO01/35644

PCT Pub. Date: May 17, 2001

Related U.S. Application Data (60) Provisional application No. 60/164,791, filed on Nov. 10, 1999.

(51) Int. Cl.
*H04N 5/85* (2006.01)
(52) U.S. Cl. .................................. 386/125; 386/126
(58) Field of Classification Search ................ 386/46, 386/68, 70, 71, 125, 126
See application file for complete search history.

(56) References Cited

U.S. PATENT DOCUMENTS

| | | | | |
|---|---|---|---|---|
| 4,626,930 | A | * | 12/1986 | Sugiyama .................... 386/105 |
| 5,566,146 | A | | 10/1996 | Tobe .............................. 369/2 |
| 5,701,383 | A | | 12/1997 | Russo et al. ................... 386/46 |
| 5,706,388 | A | * | 1/1998 | Isaka ........................... 386/125 |
| 5,774,186 | A | | 6/1998 | Brodsky et al. ............. 348/553 |
| 5,889,920 | A | | 3/1999 | Compoint et al. ............ 386/95 |
| 5,930,444 | A | | 7/1999 | Camhi et al. .................. 386/46 |
| 6,091,883 | A | | 7/2000 | Artigalas et al. .............. 386/83 |
| RE36,801 | E | | 8/2000 | Logan et al. ................ 348/571 |
| 6,233,390 | B1 | * | 5/2001 | Yoneda ........................ 386/46 |
| 6,240,244 | B1 | * | 5/2001 | Ikeda .......................... 386/125 |
| 6,259,441 | B1 | * | 7/2001 | Ahmad et al. ............... 715/720 |
| 6,678,227 | B1 | * | 1/2004 | Kondo et al. ............. 369/47.33 |

FOREIGN PATENT DOCUMENTS

WO        WO 98/11547        *  3/1998

OTHER PUBLICATIONS

US 5,825,354, 10/1998, Ahmad et al. (withdrawn)

* cited by examiner

*Primary Examiner*—Huy Nguyen
(74) *Attorney, Agent, or Firm*—Joseph J. Laks; Robert B. Levy; Jorge Tony Villabon (57) ABSTRACT

A method and apparatus for pausing a video presentation in a recordable disc medium device is provided wherein the recordable disc medium device utilizes its capability to read data at a variable rate to increase the overall average bit rate. The disc medium device can record the video presentation on the disc medium at a selected location and can periodically interrupt this recording to read from the disc medium a portion of the recorded video presentation. Additionally, the recordable disc medium device can vary the rotational speed of the disc medium to enable the disc medium device to alternate between reading and recording. While the speed of the disc medium is varying, the recordable disc medium device can read recorded data at a variable bit rate. This process increases the overall average bit rate thus enabling the disc medium device to playback and record the video presentation seamlessly.

10 Claims, 5 Drawing Sheets

DVD RECORDER PAUSE FEATURE UTILIZING VARIABLE READ RATE

This application claims the benefit under 35 U.S.C. § 365 of International Application PCT/US00/30698, filed Nov. 8, 2000, which was published in accordance with PCT Article 21(2) on May 17, 2001 in English; and which claims benefit of U.S. provisional application Ser. No. 60/164,791 filed Nov. 10, 1999.

BACKGROUND OF THE INVENTION

1. Technical Field

The inventive arrangements relate generally to methods and apparatus providing advanced operating features for audio only, video only and both video and audio programs recorded on disc media, for example recordable digital video discs, hard drives and magneto optical discs.

2. Description of the Related Art

Various devices have been developed to enable consumers to record video and/or audio programs for later presentation. Such devices include tape recorders, video cassette recorders, recordable compact discs, and most recently, recordable digital video discs (DVD). Hard drives and magneto optical discs have also been used.

A DVD that can be recorded on only once, and thereafter is essentially a DVD read only memory, is referred to by the acronym DVD-R. The acronym DVD-R is also used generally to refer to the write-once, or record-once, technology. Several formats are available for DVD's to be recorded on, erased and re-recorded; that is, overwritten or rewritten. These are referred to by the acronyms DVD-RAM, DVD-RW and DVD+RW. As of this time no uniform industry standard has been adopted. The acronyms DVD-RAM, DVD-RW and DVD+RW are also used generally to refer to the respective rewritable technologies. Reference herein to rewritable DVD technology, devices and methods is generally intended to encompass all of the standards which are now being used, as well as those which may be developed in the future.

In many cases, the program presentations are recorded in the viewer's absence for presentation at a later, more convenient time. This is referred to as time shifting the program. At other times, the viewer may be called away while he is watching a program that is not being recorded. If the viewer owns a conventional video cassette recorder, the viewer may begin recording the program during the interruption. The viewer, however, must wait until the program is completed to watch the remainder of the program in a proper time sequence. A further complication is that the time to complete the recording can be excessive depending on the length of the broadcast. This can result in the viewer ignoring the interruption or missing significant portions of the program.

To overcome this problem, a DVD video recorder can incorporate a pause feature. When activated, this setting, similar to other conventional video recording machines, allows the viewer to record incoming video. Significantly, however, when the pause resume feature is activated, the DVD video recorder jumps back to that portion of the program where the pause was initiated to commence playback yet the recorder continues to record incoming video. As a result, a viewer, if interrupted for any number of reasons, can watch a program in its entirety without having to wait for the original broadcast to end.

Although it may appear to be simultaneous, the DVD recorder cannot read and write data at the same time. Thus, to achieve seamless playback, the DVD recorder must alternate between recording data on the disc and reading this data. The time allotted for either reading or writing data is determined, at least in part, by the limited size of the DVD recorder's data buffers. As a consequence, the recorder must constantly switch between reading and writing to avoid buffer overflow or underflow. The DVD recorder, however, cannot read or write data during these transitions. Therefore, this process of alternating between reading and writing data causes a significant decrease in the combined average bit rate associated with the reading and writing process. This presents a significant problem in that a relatively high average bit rate for reading and writing must be maintained in order to provide seamless playback.

SUMMARY OF THE INVENTION

The present invention concerns a method for pausing a video presentation in a recordable disc medium device. The method can include the following steps: responsive to a pause command, recording the video presentation on the disc medium at a selected location; responsive to a pause resume command, periodically interrupting the recording to read from the disc medium a portion of the recorded video presentation; and selectively varying a rotational speed of the disc medium to increase an average bit rate throughput for the recording and reading steps.

According to one embodiment, the reading step can be performed concurrently as the rotational speed of the disc medium is varied. In addition, the rotational speed of the disc medium can be continuously varied during the reading step.

According to another embodiment, the recording can proceed radially outwardly from the selected record location on a spiral track defined by the disc medium. The rotational speed of the disc medium can be increased for the reading step relative to the recording step. Moreover, the recording on the spiral track is continuous from the selected record location to the end of the recorded video presentation without any skipped segments on the disc medium.

According to one aspect, the present invention can also include a recordable disc medium system for pausing a video presentation. The recordable disc medium system can include one or more of the following: a disc medium recorder responsive to a pause command for recording the video presentation on the disc medium at a selected record location; a disc player responsive to a pause resume command for periodically interrupting the recording to read from the disc medium a portion of the recorded video presentation; and a disc controller for selectively varying a rotational speed of the disc medium to increase an average bit rate throughput for the recording and reading steps.

According to one embodiment, the reading step can be performed concurrently as the rotational speed of the disc medium is varied. In addition, the rotational speed of the disc medium can be continuously varied during the reading step.

According to another embodiment, the recording can proceed radially outwardly from the selected record location on a spiral track defined by the disc medium. The rotational speed of the disc medium can be increased for the reading step relative to the recording step. Moreover, the recording on the spiral track is continuous from the selected record location to the end of the recorded video presentation without any skipped segments on the disc medium.

DETAILED DESCRIPTION OF THE PREFERRED EMBODIMENTS

Recordable DVD Device

Figure 1:
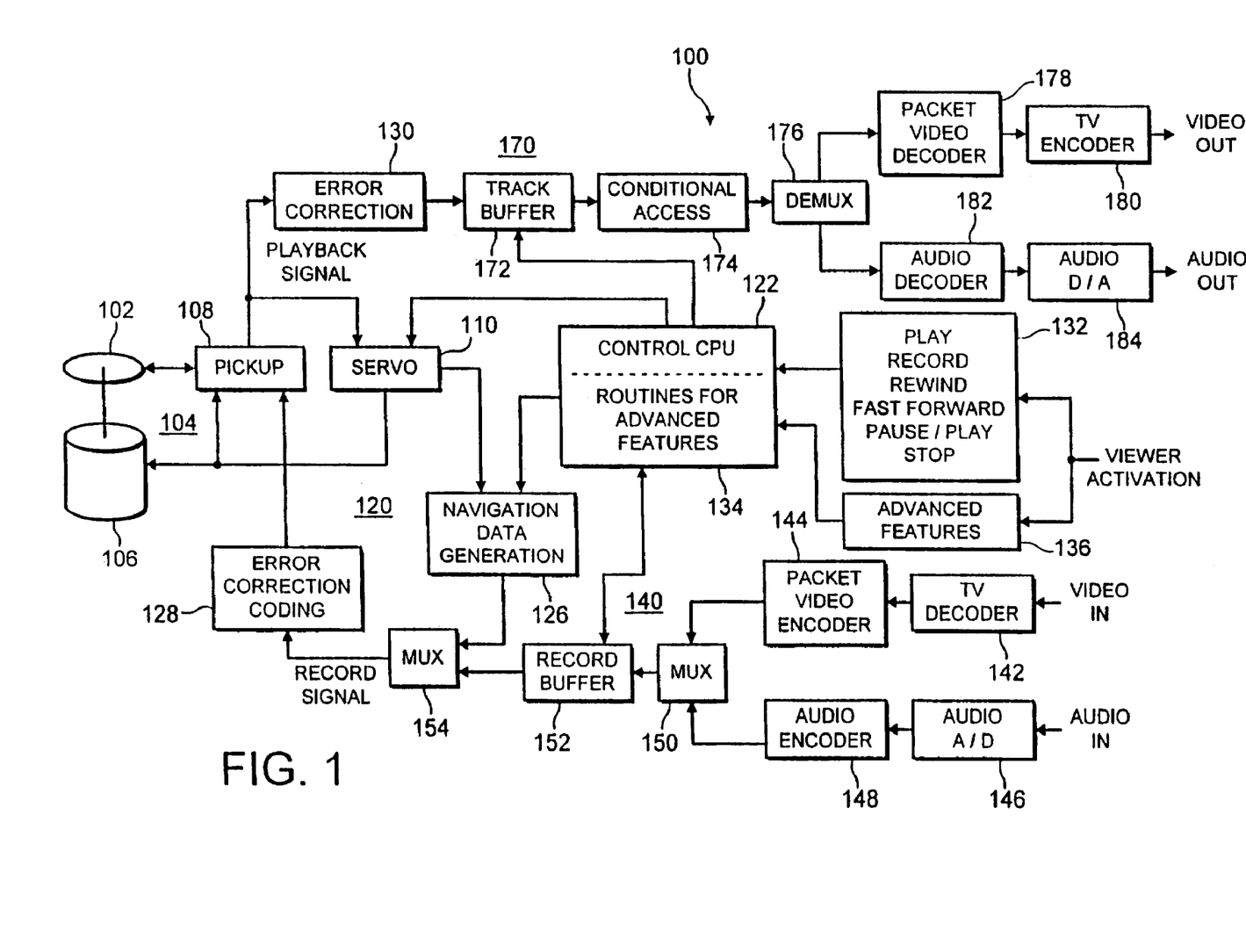
FIG. 1 is a block diagram of a rewritable DVD device that can be provided with one or more advanced operating features in accordance with the inventive arrangements.

A device 100 for implementing the various advanced operating features in accordance with the inventive arrangements taught herein utilizes a rewritable disc medium 102 in accordance with the inventive arrangements is shown in block diagram form in FIG. 1. The rewritable disc medium 102 is embodied as a rewritable DVD in the illustrated embodiment. In many instances, as will be noted, the rewritable disc medium can also be, for example, a hard drive or a magneto optical disc (MOD). An example of a MOD is a mini-disc. In many instances, the inventive arrangements are applicable to video or audio or both video and audio.

The device 100 is capable of writing onto and reading from the disc medium, in this example, a rewritable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the DVD 102 and a pickup assembly 108 that is adapted to be moved over the spinning disc. A laser on the pickup assembly burns spots onto a spiral track on the disc or illuminates spots already burned onto the track for recording and playing back video and/or audio program material. For purposes of understanding the invention, it is irrelevant whether the disc is recordable on one or two sides, or in the event of a double-sided recording, whether the double-sided recording, or subsequent reading from the disc, takes place from the same side of the disc or from both sides. The pickup and the motor are controlled by a servo 110. The servo 110 also receives the Playback Signal of data read from the spiral track of the disc 102 as a first input. The Playback Signal is also an input to an error correction circuit 130, which can be considered part of the control section or part of the video/audio output processing path.

The control section 120 comprises a control central processing unit (CPU) 122 and a navigation data generation circuit 126. The control CPU 122 supplies a first input signal to the navigation data generation circuit 126 and the servo 110 supplies a second input signal to the navigation data generation circuit 126. The servo can also be considered part of the control section. The navigation data generation circuit 126 supplies a first input signal to the multiplexer (MUX) 154, which forms part of the video/audio input processing path 140.

The output of the MUX 154 is an input to an error correction coding circuit 128. The output of the error correction coding circuit 128 is a recordable input signal supplied to the pickup 108, which will be "burned" onto the spiral track of the disc 102 by the laser.

The control CPU 122 also preferably has access to the data contained in the track buffer 172 and record buffer 152 as shown in FIG. 1. CPU 122 can delete, modify, and reformat video data stored in the track buffer 172 and record buffer 152. Control and data interfaces are also preferably provided for permitting CPU 122 to control the operation of video encoder 144 and audio encoder 148. Suitable software or firmware is provided in memory for the conventional operations performed by control CPU 122.

A control buffer 132 for viewer activatable functions indicates those functions presently available, namely play, record, reverse, fast forward, slow play, pause/play and stop. A separate buffer 136 is provided to receive commands for implementing the inventive arrangements taught herein. For example, the special pause feature as described herein can be accessed via the buffer 136.

The video/audio input processing path 140 is a signal processing circuit for converting a conventional television signal, for example NTSC or PAL, into digitized packet data, for example MPEG-1 or MPEG-2, for digital recording by the device 100. The input path 140 comprises an NTSC decoder 142 and video encoder, for example MPEG-1 or MPEG-2, 144 for video in, and comprises an audio analog-to-digital converter (A/D) 146 and an audio encoder, for example MPEG-1 or MPEG-2, 148. The digitized signals are combined in a multiplexer 150 and stored in a record buffer 152 until an entire packet has been constructed. As groups of audio and video data packets are created, they are combined in MUX 154 with appropriate navigation packets generated in the navigation data generation block 126. The packets are then sent on to the error correction coding circuit 128. Error correction coding circuit 128 can also be deemed to be part of the input path 140.

The output processing path 170 comprises error correction block 130 and a track buffer, or output buffer, 172, in which data read from the disc is assembled into packets for further processing. The packets are processed by conditional access circuit 174 that controls propagation of the packets through demultiplexer 176 and into respective paths for video and audio processing.

The video is decoded by decoder 178, for example from MPEG-1 or MPEG-2, and encoded as a conventional television signal, for example NTSC or PAL. The audio is decoded by circuit 182, for example from MPEG-1 or MPEG-2, and converted to analog form by audio digital-to-analog (D/A) converter 184.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the control CPU 122 described above.

DVD Media

Figure 2:
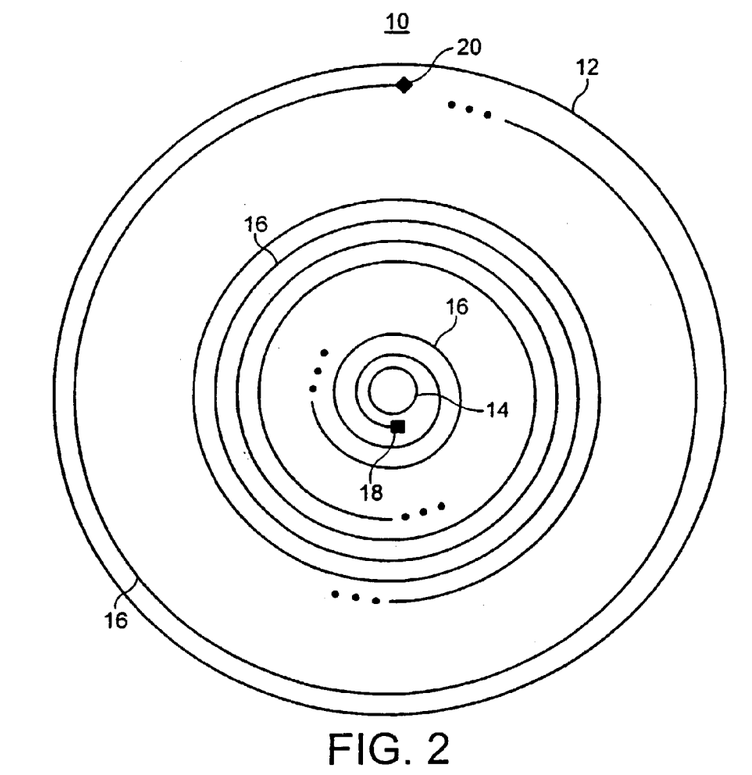
FIG. 2 is a diagram useful for illustrating the spiral track on a rewritable DVD disc.

For purposes of illustrating the inventive arrangements, program material can be recorded onto a rewritable DVD and played back from a rewritable DVD. Those skilled in the art, however, will appreciate that the invention is not limited in this regard. Rather, a pause feature utilizing a variable read rate can be used with any type of disc media, including but not limited to DVD-R or DVD-RW type media. Referring to FIG. 2, the disc 102 is more clearly shown. The disc 102 is formed by a flat, round plastic plate-like member 12. The re-writable DVD can consist of two substrates bonded together by an adhesive layer forming a 1.2 mm thick disk. A center hole 14 can be formed in the disk so that a gripping device of the motor 106 of FIG. 1 can securely grip the disk and control the angular motion of the same in accordance with the inventive arrangements.

The direction of recording on the track is typically outwardly along a spiral track 16, from a smaller radius part of the spiral to a larger radius part of the spiral. The several series of three large dots (____) denote portions of the track not shown in the drawing. As a result, the beginning of the spiral track is deemed to be near the hole 14, and is denoted by square 18. The end of the spiral is deemed to end near the rim, and is denoted by diamond 20. Those skilled in the art generally accept defining the beginning and end of the spiral as noted. The track can also have a side-to-side wobble, not shown in the drawing, to accommodate media type indexing. Due to difficulties of scale only portions of the track 16 are shown, and these are shown in greatly enlarged scale.

Each nearly circular, radially concentric section of the spiral is sometimes referred to as a track, but this terminology is not commonly accepted as having that specific meaning. In CD-ROM's, for example, the term track is also used to refer to that portion of the spiral track that contains a single audio song, or other selection, and the same may or may not become common for DVD's.

Pause Feature Utilizing Variable Read Rate

A recordable disc medium device having a pause feature must be capable of concurrently recording an incoming presentation to a disc medium and playing back an earlier part of the presentation previously recorded to the medium. Although the medium can be video, audio or a combination thereof, it is understood that the device is not limited in this regard. For example, a recordable DVD device can record and play video, audio or a combination thereof. The inventive arrangements herein implement a pause feature by causing the recordable disc medium device to interrupt periodically the writing of incoming data to a disc to read a portion of such data recorded on the disc. For convenience, the invention shall be described relative to a recordable DVD device, it being understood that the invention is not so limited.

Figure 3:
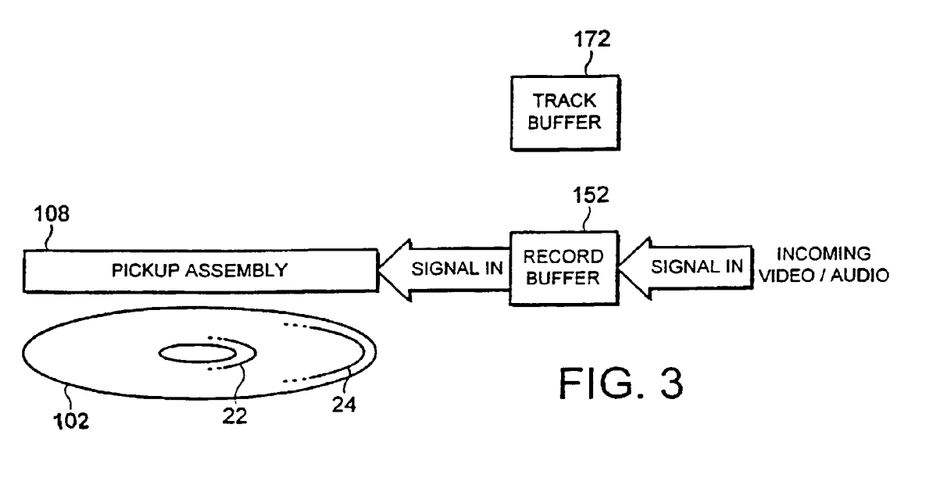
FIG. 3 is a block diagram illustrating the process of writing data onto a DVD disc.

As shown in FIG. 3, once the pause feature is activated, a DVD device can move the pickup assembly 108 to a selected location on the disc 102. Once the pickup assembly 108 is in position, the DVD device can begin to write or record data. To be compatible with present day DVD devices, it is preferred to begin recording at an inner radius of the disc 102 and to continue recording to an outer radius. For example, in FIGS. 3–5, an inner portion of the spiral track 16 where recording can begin is designated by reference numeral 22 whereas an outer portion where writing can end is designated by reference numeral 24. Thus, the pickup assembly 108 can move gradually along spiral track 16 from the inner portion 22 towards the outer portion 24 as the writing step is performed.

During this recording process, incoming data is usually received at 5.5 Mb/s but can be received at varying rates. Typically, incoming data merely propagates through the record buffer 152 as it is being recorded onto the disc 102. As a result, the record buffer 152 can be empty or nearly empty while the pause feature is activated. In addition, since no reading is taking place at this time, no data is entering or leaving track buffer 172.

Figure 4:
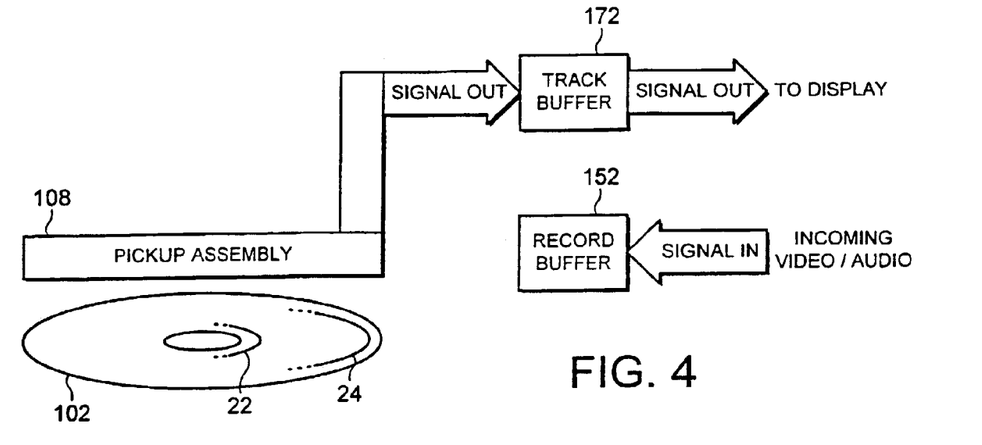
FIG. 4 is a block diagram illustrating the process of reading data from a DVD disc and storing incoming data in a data buffer.

Referring to FIG. 4, after a pause resume command is received, the DVD device can temporarily stop writing data. As an example, the DVD device can temporarily stop writing at the outer portion 24 of the spiral track 16. Accordingly, the record buffer 152 can begin to store temporarily the incoming data. Thereafter, the DVD device can position the pickup assembly 108 over that section of the disc 102 where the recording of the incoming data was initiated. For purposes of this example, that disc position can be the inner portion 22 of the spiral track 16. At this point, the DVD device can begin to read the previously recorded data and can send this data to the track buffer 172. Data typically leaves the track buffer 172 at a rate of 5.5 Mb/s, but the DVD device can read data from the disc 102 at a higher rate. Accordingly, the track buffer 172 can accumulate data read from the disc 102. This data can continue to be decoded and displayed after the pickup assembly 108 temporarily stops reading and attends to writing data.

Figure 5:
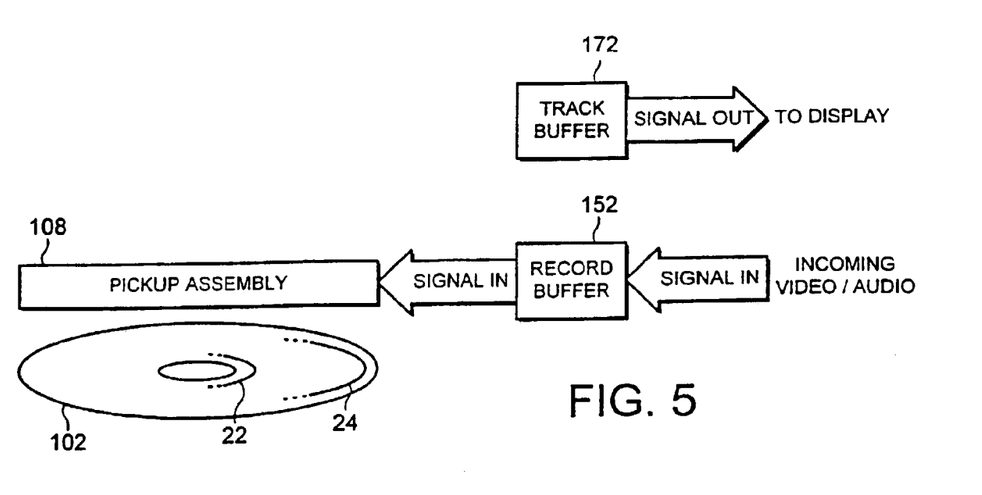
FIG. 5 is a block diagram illustrating the process of writing data to a DVD disc and continuing to display previously read data from a data buffer.

As shown in FIG. 5, when the data in the record buffer 152 reaches a predetermined level, the DVD device can suspend the reading process. With its supply of data temporarily stopped, the track buffer 172 can begin to empty. The DVD device can then move the pickup assembly 108 to the spot on the disc 102 where the incoming data was last written, for example, the outer portion 24 of spiral track 16. The DVD device can then record on the disc 102 the data that has accumulated in the record buffer 152. Writing can continue until the amount of data in the track buffer 172 drops to a predetermined level. When that happens, the DVD device can once again temporarily stop writing and move pickup assembly 108 to the spot on the disc 102 where data was last read. Thereafter, the DVD device will proceed to read data.

This process of jumping between reading and writing can continue until the user terminates the pause resume mode of operation, or alternatively, until the disc runs out of space.

The constant positioning and repositioning of the pickup assembly 108 causes a decrease in the combined average bit rate associated with the reading and writing steps. This is because the DVD device cannot read or write data while the pickup assembly 108 is being moved. As used herein, the combined average bit rate refers to the bit rate of the reading process averaged with the bit rate of the writing process. If the combined average bit rate is not high enough, the DVD device will be unable to achieve seamless playback and/or recording. As a result, the DVD device requires high reading and writing speeds to overcome the inefficiencies associated with the jumping process. Unfortunately, writing speed is limited because writing data on the disc 102 is thermal in nature and cannot be easily increased.

Increasing the reading speed is a potential solution. To accomplish faster reading, the DVD device can increase the rotational speed of the disc 102 when the pause feature is in read mode. Speeding up the reading rate can increase the average bit rate. As will be further illustrated, however, this procedure alone is insufficient for purposes of producing a seamless playback because of a second factor that negatively affects the average bit rate.

For a given angular velocity of a disc, the linear velocity at an outer radius of that disc is higher than the linear velocity at an inner radius. As the pickup assembly 108 moves towards the outer part of the disc 102 during the writing stage, the angular velocity of the disc 102 must be decreased. This is because the writing speed is fixed to a certain rate.

When the DVD device transitions from writing to reading, the pickup assembly 108 must jump back to an inner radius to read the previously recorded data. The linear velocity at that particular inner radius, however, is much lower for a given disc RPM as compared to the linear velocity at the outer radius at which data was last written. As a result, the RPM speed of the disc 102 must be increased significantly to allow the DVD device to read data at a faster rate than the previous writing rate. Conversely, jumping back to write data at an outer radius necessitates an equivalent slowdown due to the fixed rate at which data can be written. With a spindle motor having limited torque, these changes in angular velocity take an appreciable amount of time thereby lowering the combined average bit rate. In addition, the DVD device generally must write data at a constant bit rate, as such a restriction is well known in the art. Therefore, the DVD device cannot record as the disc 102 is changing speed to prepare for a jump. Such a restriction further contributes to the overall drop in average bit rate for the entire read/write cycle.

Figure 6:
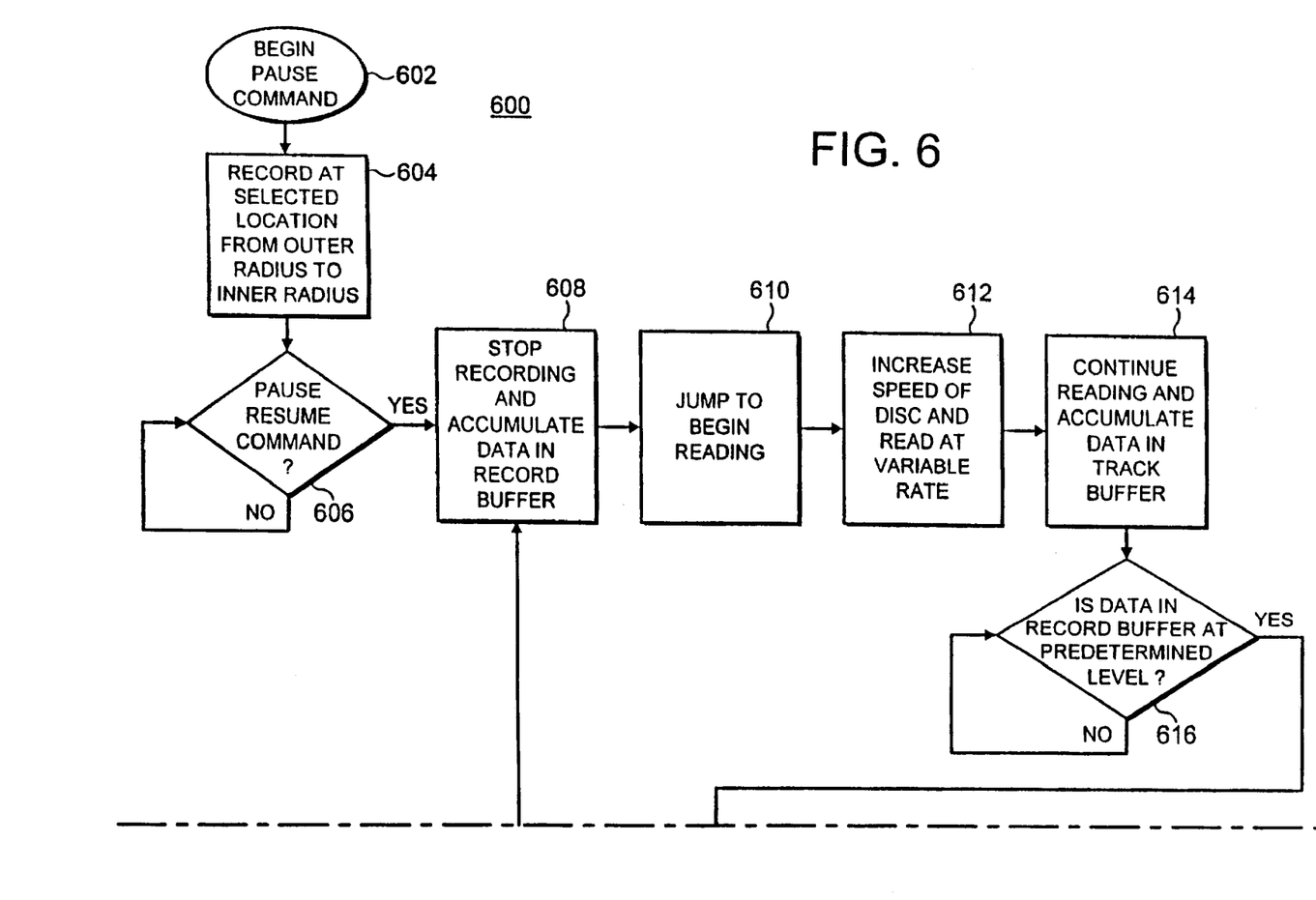
FIG. 6 is a flow chart illustrating the preferred operation of a DVD device that implements a pause function that utilizes a variable read rate to maximize overall average bit rate of the DVD device.

In accordance with the inventive arrangements taught herein, the DVD device solves the bit rate problem by utilizing its capability to read data at variable rates. Such a procedure can maximize the overall effective reading duty cycle. Turning to FIG. 6, flow chart 600 illustrates the preferred method of operation. The process is initiated in step 602 when a pause command is received, for example, via the advanced features buffer 136. At step 604, the DVD device can begin to record data at a selected location on the disc 102 as shown in FIG. 3. The selected location can be chosen by a user, or the DVD device can simply begin recording at a location where unused space is available. The DVD device begins recording at an inner radius of the disc 102 and continues to record along spiral track 16 towards an outer radius of the disc 102. Additionally, recording can proceed until the DVD device receives a pause-resume command in step 606.

If a pause-resume command is received in step 606, then the DVD device can stop recording and begin accumulating incoming data in the record buffer 152 as shown in step 608. This incoming data will be recorded at the next write step. The pickup assembly 108 can then jump back in step 610 to the location on the disc 102 where the earlier portion of the presentation had been recorded on the disc 102. At step 612, the DVD device preferably speeds up the disc 102 to allow the DVD device to read data at a rate higher than the previously used writing rate. According to the inventive arrangements, the DVD device begins reading data as the disc 102 is accelerating in order to minimize any reading delay associated with moving the pickup assembly 108 from the record location to the read location.

In order to read data from the disc 102 while its angular velocity is changing, the DVD device preferably includes phase-locked loop (PLL) circuitry with a wide range lock capability. This PLL circuitry can generate a clock signal by locking onto the data being read from the disc 102 and can maintain this lock as the rotational speed of the disc 102 changes. Such circuitry is well known in the art, however, and is not critical to understanding the inventive concepts presented herein.

While reading the data in step 614, the DVD device can begin to accumulate data in the track buffer 172. As shown in step 616, the DVD device can read at an accelerated rate until the data in the record buffer reaches a predetermined level which indicates that it is approaching or is at maximum capacity. At step 618, the DVD device can then decrease the rotational speed of the disc 102. Similar to the disc acceleration process, the DVD device can continue to read data at a variable bit rate as the angular velocity of the disc 102 drops.

At step 620, the DVD device can read data at a variable rate until the rotational speed of the disc 102 has reached or nearly reached a speed slow enough to allow writing at the proper rate. As shown in step 622, the DVD device can stop reading, and the data accumulated in the track buffer 172 can continue to be decoded and displayed as the DVD device temporarily suspends the reading process. At step 624, the pickup assembly 108 jumps back to the outer radius where recording last occurred to begin writing data once again. The DVD device records data at the outer radius until the data in the track buffer 172 drops to a certain level indicating that the track buffer 172 is nearly empty. In accordance with step 628, the pause-resume mode can continue at step 608 until the user indicates that the pause-resume mode should be terminated in step 630. Alternatively, in the event disc capacity is reached, the pause-resume mode can also stop at step 630. In either event, the DVD device can continue to read the remaining data on the disc 102, as shown in step 630.

A significant advantage of the inventive arrangement is that the time required for speeding up or slowing down the disc 102 is no longer wasted. Rather, this time is used to read data at a variable bit rate. Such a design can maximize the overall combined average bit rate thus permitting time for the pickup assembly to make large jumps. Furthermore, the present invention can minimize the disc acceleration and deceleration rates required by the DVD device. Since the DVD device can read data at a variable rate, the DVD device can spend more time changing the angular velocity of the disc 102. Lowering the rate at which the disc changes speeds can lead to less stress on the spindle motor for improved reliability, less power consumption and lower noise generation.

The invention claimed is:

1. In a recordable disc medium device, a method for pausing a video presentation comprising:
   responsive to a pause command, recording said video presentation on said disc medium at a selected record location;
   responsive to a pause resume command, periodically interrupting said recording to read from said disc medium a portion of said recorded video presentation; and
   selectively varying a rotational speed of said disc medium while concurrently reading from said disc medium to increase an average bit rate throughput for said recording and said reading steps.

2. The method according to claim 1 wherein said rotational speed of said disc medium is continuously varied during said reading step.

3. The method of claim 1 wherein said recording proceeds radially outwardly from said selected record location on a spiral track defined by said disc medium.

4. The method according to claim 3 wherein said rotational speed of said disc medium is increased for said reading step relative to said recording step.

5. The method according to claim 3 wherein said recording on said spiral track is continuous from said selected record location to the end of said recorded video presentation without any skipped segments on said disc medium.

6. A recordable disc medium system, for pausing a video presentation comprising:
   a disc medium recorder responsive to a pause command for recording said video presentation on said disc medium at a selected record location;
   a disc player responsive to a pause resume command for periodically interrupting said recording to read from said disc medium a portion of said recorded video presentation; and
   a disc controller for selectively varying a rotational speed of said disc medium while concurrently reading from said disc medium to increase an average bit rate throughput for said recording and said reading steps.

7. The recordable disc medium system according to claim 6 wherein said rotational speed of said disc medium is continuously varied during said reading step.

8. The recordable disc medium system according to claim 6 wherein said recording proceeds radially outwardly from said selected record location on a spiral track defined by said disc medium.

9. The recordable disc medium system according to claim 8 wherein said rotational speed of said disc medium is increased for said reading step relative to said recording step.

10. The recordable disc medium according to claim 8 wherein said recording on said spiral track is continuous from said selected record location to the end of said recorded video presentation without any skipped segments on said disc medium.

* * * * *